(12) United States Patent
De'Padova et al.

(10) Patent No.: US 7,762,435 B2
(45) Date of Patent: Jul. 27, 2010

(54) DISPENSING APPARATUS

(75) Inventors: Paul Ippolito De'Padova, Derby (GB); Mark Anthony Ian Gidlow, Nottingham (GB)

(73) Assignee: Plasticum Group BV, Tilburg (NL)

( * ) Notice: Subject to any disclaimer, the term of this patent is extended or adjusted under 35 U.S.C. 154(b) by 1015 days.

(21) Appl. No.: 10/560,663

(22) PCT Filed: Jun. 14, 2004

(86) PCT No.: PCT/GB2004/002549

§ 371 (c)(1), (2), (4) Date: Dec. 13, 2005

(87) PCT Pub. No.: WO2004/110721

PCT Pub. Date: Dec. 23, 2004

(65) Prior Publication Data

US 2007/0138214 A1   Jun. 21, 2007

(51) Int. Cl.
*B65D 83/00* (2006.01)

(52) U.S. Cl. .................................. 222/402.13; 222/490

(58) Field of Classification Search ............ 222/403.12, 222/490–497, 107, 212, 213, 422, 457, 511, 222/513; 215/11.1, 11.4
See application file for complete search history.

(56) References Cited

U.S. PATENT DOCUMENTS

| 729,423 A | 5/1903 | Scheiber |
| 3,684,137 A | 8/1972 | Coleman |
| 3,991,916 A * | 11/1976 | Del Bon ................. 222/402.13 |
| 5,154,328 A * | 10/1992 | Gueret ........................ 222/494 |
| 5,501,375 A | 3/1996 | Nilson |
| 5,588,565 A | 12/1996 | Miller |
| 5,743,443 A | 4/1998 | Hins |
| 5,868,287 A * | 2/1999 | Kurokawa et al. .......... 222/380 |
| 6,152,324 A | 11/2000 | Baudin |
| 6,497,346 B1 | 12/2002 | Dubois |

FOREIGN PATENT DOCUMENTS

| EP | 0 673 852 A1 | 9/1995 |
| EP | 0 713 832 A1 | 5/1996 |
| EP | 0 856 390 A1 | 8/1998 |
| WO | 86/06273 A1 | 11/1986 |
| WO | 00/26007 A1 | 5/2000 |
| WO | 02/098756 A2 | 12/2002 |

OTHER PUBLICATIONS

International Search Report for International Patent Application No. PCT/GB2004/002549 (Sep. 24, 2004).

\* cited by examiner

*Primary Examiner*—Lien T Ngo
(74) *Attorney, Agent, or Firm*—Nixon Peabody LLP

(57) ABSTRACT

A process for the manufacture of dispensing apparatus includes moulding a first component including a tubular outlet and moulding a second component about the first component. The first component is moulded in a first material and the second component is moulded in a second material, where the first material comprises a less rigid material than the second material. The first component is moulded with the tubular outlet in an open configuration and the moulding of the second component compresses the tubular outlet to a closed configuration. The tubular outlet is elastically deformable, by the application of pressure to the tubular outlet, from the closed configuration to the open configuration.

4 Claims, 5 Drawing Sheets

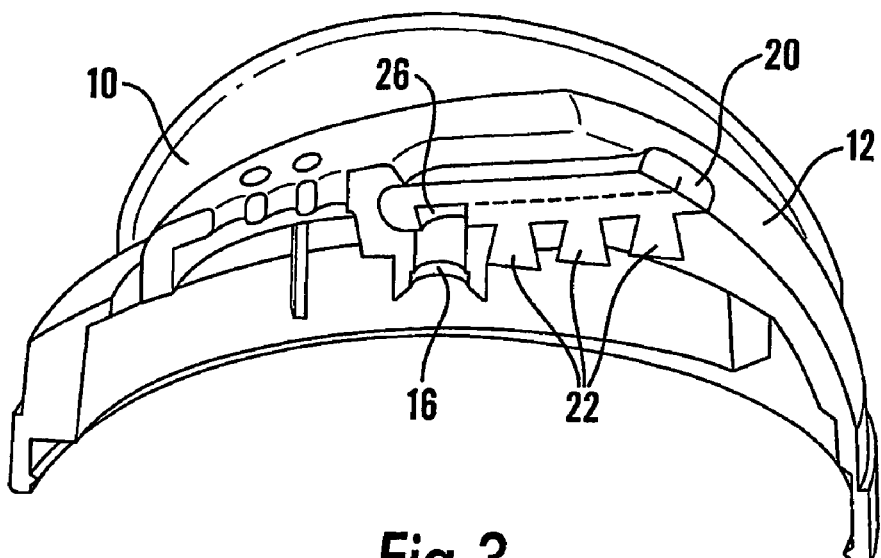
Fig.3
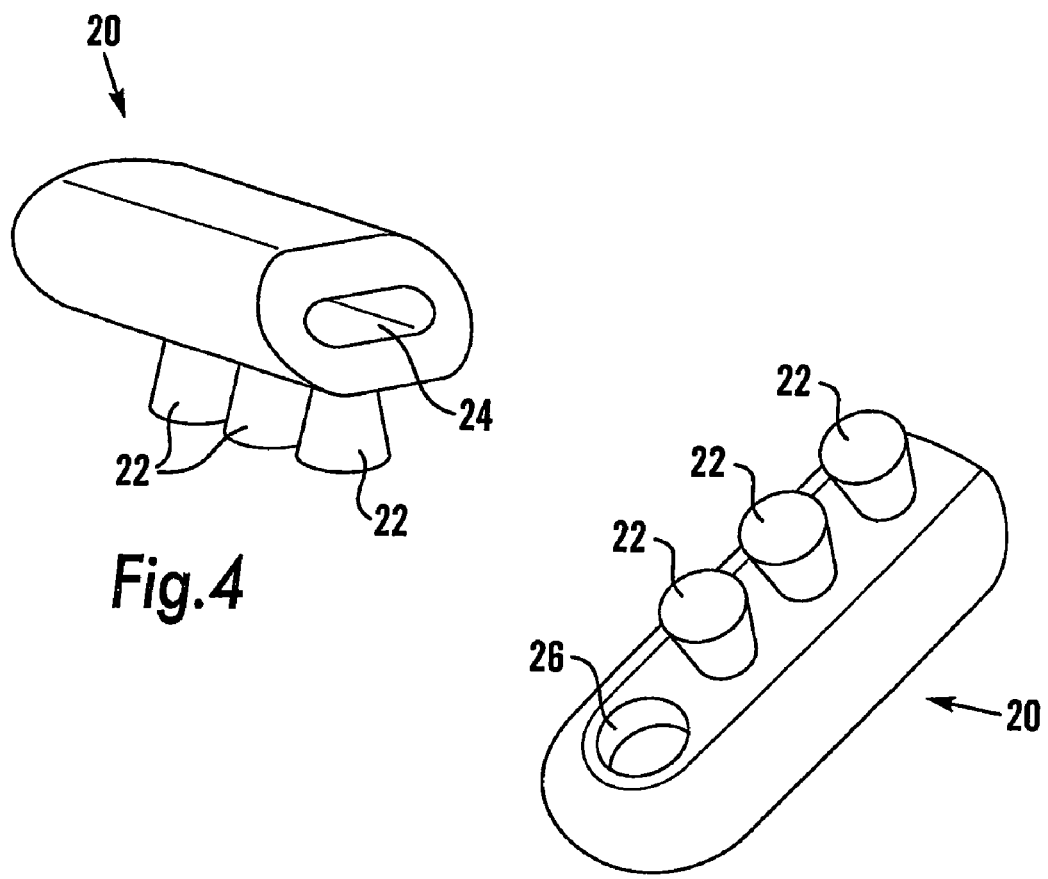
Fig.4
Fig.5

DISPENSING APPARATUS

This application is a national stage application under 35 U.S.C. §371 from PCT Application No. PCT/BG2004/002549, filed Jun. 14, 2004.

FIELD OF THE INVENTION

This invention relates to dispensing apparatus, and in particular to improvements in the design and manufacture of dispensers for the dispensing of fluid products from containers.

BACKGROUND

Many different forms of fluid product are packaged in containers from which aliquots of the product are dispensed as required. By "fluid products" is meant in this context products that may be caused to flow by the application of pressure. Examples include liquids, both non-viscous and viscous, pastes, gels, foams, sauces and the like. Many such products are supplied in pressurised canisters. Typically, such products are packaged in a sealed container fitted with a dispensing valve. Some form of actuator is fitted to the container, often as a cap, the actuator including means for operating the valve and including an outlet through which the product is dispensed. Many products of this type are dispensed as foams or gels. Examples include many cosmetic, personal care or food products, such as shaving foams or gels, hair gels and mousses, sauces, as well as skincare products and many others.

Conventional actuators for products of this type generally comprise a fluid conduit leading to an outlet opening, the fluid conduit being in fluid communication with the dispensing valve. Generally, the user depresses the actuator to actuate the valve and dispense the product, and releases the actuator once sufficient product has been dispensed.

A major problem with known actuators of this type is that after the actuator is released and the valve closes, a certain amount of product may remain in the fluid conduit. This residual product may dry up and block the fluid conduit. Also, if the product is one that generates a foam upon reaching the atmosphere, the product may continue to ooze from the fluid conduit for an appreciable time after the valve closes. In addition, any product that remains in the fluid conduit will be dispensed next time that the actuator is used. In the meantime, that product may have deteriorated, or even become harmful.

Other forms of product with which the invention is concerned include containers fitted with pump mechanisms by which material can be pumped through an outlet on depression of an actuator, and containers formed in flexible material so that manual squeezing of the container by a user urges material from the container through an outlet. In general, the invention may be applicable to any product that is dispensed from a container by the application of pressure, however that pressure is generated.

SUMMARY

There have now been devised improvements in the design and manufacture of dispensing apparatus which overcome or substantially mitigate the above-mentioned and/or other disadvantages associated with the prior art.

According to a first aspect of the invention, there is provided dispensing apparatus for a fluid product, said apparatus comprising a container having a tubular outlet, wherein the tubular outlet has a collapsed non-dispensing configuration and wherein the tubular outlet is elastically deformable, by the application of pressure to the tubular outlet, to an expanded dispensing configuration in which the fluid product is able to flow through the tubular outlet.

The tubular outlet constitutes a fluid conduit that is closed when the tubular outlet is in the collapsed, non-dispensing configuration and opened when the tubular outlet is in the expanded, dispensing configuration.

In one particular embodiment of the invention, the dispensing apparatus comprises a pressurised container fitted with a dispensing valve having a valve outlet, and an actuator in which the tubular outlet is formed, the actuator being engaged with the dispensing valve such that depression of the actuator opens the dispensing valve.

In such an embodiment, the actuator preferably takes the form of a cap that is fitted to the container. Thus, according to a further aspect of the invention, there is provided an actuator cap adapted to engage a pressurised container fitted with a dispensing valve having a valve outlet, the actuator cap comprising an actuator including a tubular outlet including a fluid conduit, wherein the tubular outlet has a collapsed non-dispensing configuration in which the fluid conduit is closed and wherein the tubular outlet is elastically deformable, by the application of pressure to the tubular outlet, to an expanded dispensing configuration in which the fluid conduit is opened.

By "elastically deformable" is meant that if the tubular outlet is deformed to its dispensing configuration by an applied force or pressure, the tubular outlet will revert to its non-dispensing configuration when the applied force or pressure is removed.

The dispensing apparatus and actuator cap according to the invention are preferably arranged such that liquid product exits the container under pressure, in use, and this pressure is sufficient to elastically deform the tubular outlet to its expanded dispensing configuration. The fluid product thus preferably functions as a pressure medium that acts upon the tubular outlet to deform it from the collapsed to the expanded configuration. In other embodiments, however, an external force or pressure may be applied to the tubular outlet to deform it to the expanded configuration.

The dispenser according to the invention is advantageous principally because the elastically deformable nature of the tubular outlet ensures that the outlet is automatically sealed when not in use. This reduces the amount of substance that remains in the outlet between uses, thereby reducing the likelihood that the outlet will become blocked. In addition, the outlet will become sealed almost simultaneously with the removal of pressure from within the outlet, thereby reducing the amount of substance that continues to be dispensed after the pressure is removed.

Most preferably, the tubular outlet is moulded in an open configuration and is at least partially encased in a more rigid material, the casing being arranged so as to hold the tubular outlet in its non-dispensing configuration, in which the fluid conduit is closed, when not in use. The material of the casing preferably at least partially surrounds the tubular outlet, the casing material exerting sufficient pressure on the tubular outlet to retain the tubular outlet in its non-dispensing configuration until the liquid product flows under pressure from the container, whereupon the tubular outlet expands to the dispensing configuration.

The tubular outlet is preferably formed by injection moulding in an elastomeric material. In this case, the assembly of tubular outlet and more rigid casing is preferably manufactured by two-stage injection moulding. In other embodiments, the tubular outlet and the more rigid component can be manufactured by injection moulding as two separate components and assembled after moulding. In the case of two-stage injection moulding, the tubular outlet is preferably moulded first, and the casing of more rigid material then moulded about the tubular outlet. This is unusual, in that two-stage injection moulding processes involving materials that are relatively rigid and relatively flexible are usually carried out by moulding first the relatively rigid material, followed by moulding of the more flexible material.

According to a further aspect of the invention, there is provided a process for the manufacture of dispensing apparatus for a liquid product, the process comprising moulding a first component including a tubular outlet, the first component being moulded in a first, relatively less rigid material, and moulding a second component about the first component, the second component being moulded in a second, relatively more rigid material, wherein the first component is moulded with the tubular outlet in an open configuration and moulding of the second component compresses the tubular outlet to a closed configuration, the tubular outlet being elastically deformable, by the application of pressure to the tubular outlet, from the closed configuration to the open configuration.

One example of a first, relatively less rigid, material that is suitable for the moulding of the first component is a thermoplastic elastomer. One example of a second, relatively more rigid, material that is suitable for the moulding of the second component is polypropylene.

Pressure applied to the tubular outlet elastically deforms the tubular outlet from its non-dispensing configuration, in which the fluid conduit is sealed, to its dispensing configuration, in which the fluid conduit is open. Most preferably, the dispensing apparatus is arranged such that liquid product flowing into the tubular outlet above a certain pressure, in use, is sufficient to elastically deform the tubular outlet to its expanded dispensing configuration.

In particular, the liquid product will be dispensed through the fluid conduit of the tubular outlet when the liquid product is supplied from the container to the fluid conduit above a certain pressure. In this case, when the liquid product ceases to be supplied from the container to the fluid conduit above a certain pressure, the tubular outlet will revert back from its dispensing configuration, in which the fluid conduit is open, to its non-dispensing configuration, in which the fluid conduit is sealed. In this way, the fluid conduit will become sealed automatically when liquid product ceases to be supplied from the container to the fluid conduit.

The dispensing apparatus may be arranged such that the entire fluid conduit is collapsed, and hence all fluid product within the fluid conduit is expelled, when the tubular outlet reverts back from its dispensing configuration to its non-dispensing configuration.

Alternatively, the fluid conduit may include an enlarged portion which forms a sealed cavity within the tubular outlet in its non-dispensing configuration. A small amount of the liquid product will therefore remain within the cavity in the collapsed, non-dispensing configuration. However, the volume of the cavity is preferably significantly less than the volume of the fluid conduit in its dispensing configuration. Most preferably, the enlarged portion is formed with an inclined surface at its downstream end so as to facilitate deformation of the tubular outlet by the liquid product.

The provision of an enlarged portion of the fluid conduit is only suitable for applications where it is acceptable for a small amount of the liquid product to remain within the cavity in the non-dispensing configuration. This embodiment generally has a more reproducible dispensing action than the embodiments in which the entire tubular outlet is collapsed because less pressure is required to elastically deform the tubular outlet to the dispensing configuration.

Preferably, where the tubular outlet is incorporated into an actuator cap, the actuator itself comprises a portion of the cap that is movable relative to the remainder of the cap. Alternatively, the entire cap may be movable relative to the container.

Where the container is fitted with a valve having a valve stem that releases material from the container when depressed, the actuator is preferably adapted to receive the valve stem so that the valve stem is in fluid communication with the fluid conduit, and depression of the actuator will depress the valve stem, thereby releasing liquid product from the container.

Alternatively, the container and/or cap may include means for pumping liquid product from the container through the outlet. For instance, the container and/or cap may include a pump mechanism that pumps material through the outlet on depression of an actuator. Another alternative is that the container may be formed in a flexible material so that manual squeezing of the container by a user urges liquid product from the container through the outlet.

The cap may be adapted to engage the container in any suitable manner. Examples include a snap-fit engagement, a threaded engagement and a bayonet-type engagement. It will be appreciated, however, that other forms of engagement may be used.

The tubular outlet is preferably formed in an elastomeric material, and most preferably a thermoplastic elastomeric material. The fluid conduit is preferably of generally constant cross-section along its length, and preferably has openings of substantially similar size at either end, thereby forming inlet and outlet openings. However, the fluid conduit may include an enlarged portion which forms a cavity within the tubular outlet when the tubular outlet is in the collapsed, non-dispensing configuration, as discussed above.

Preferably, the fluid conduit has a flattened cross-section and is elastically deformable along the minor axis of the flattened cross-section. The external surface of the tubular outlet may include a formation that is adapted to mate with a corresponding formation formed on the remainder of the cap. In a currently preferred embodiment, the fluid conduit (ie the internal bore of the tubular outlet), and most preferably also the external surface of the tubular outlet, is of generally hexagonal cross-section. It will be appreciated, however, that many other cross-sectional shapes may be employed.

The container may be generally conventional in form, eg comprising a canister of aluminium or the like fitted with a conventional dispensing valve. Again, it will be apparent to those skilled in the art that many other forms of container may be suitable for use in the invention.

BRIEF DESCRIPTION OF THE DRAWINGS

One embodiment of the present invention, in the form of a aerosol spray cap, will now be described in greater detail, by way of example only, with reference to the accompanying drawings, in which

FIG. 3 is a perspective view of the aerosol spray cap, partly cut away;

FIG. 4 is a perspective view of a nozzle component of the aerosol spray cap, the nozzle component being in its open state;

FIG. 5 is a perspective view of the underside of the nozzle component;

DETAILED DESCRIPTION

Figure 1:
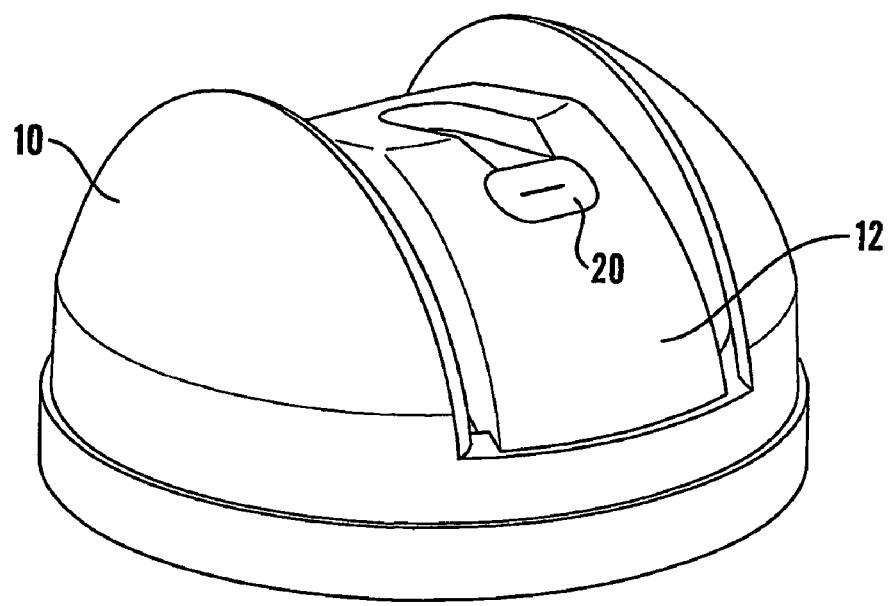
FIG. 1 is a perspective view of an aerosol spray cap according to the invention.
Figure 2:
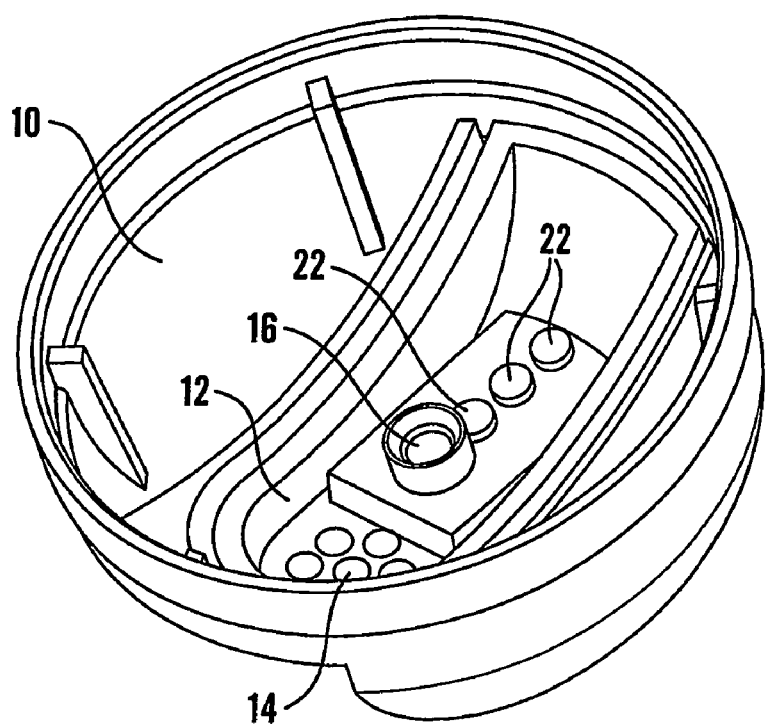
FIG. 2 is a perspective view of the underside of the aerosol spray cap.

FIGS. 1, 2 and 3 show an aerosol spray cap according to the invention. The aerosol spray cap comprises a cap component 10 and a nozzle component 20. The cap component 10 is formed in polypropylene, and the nozzle component 20 is formed in a thermoplastic elastomeric material. The aerosol spray cap is formed in a two-shot injection moulding process which is described in more detail below.

The cap component 10 is generally dome-shaped with an open lower end (as viewed in FIG. 1). The open lower end of the cap component 10 is adapted to fit closely about the upper end of an aerosol canister. The interior surface of the cap component 10 is formed with a shoulder that abuts the peripheral edge of the aerosol canister when the cap component 10 is engaged therewith.

The cap component 10 comprises a central actuator portion 12 that is separated from the remainder of the cap component 10 on all sides save for a single connecting side that forms a hinge. In use, the hinged side is at the front of the spray cap. The free end of the actuator 12 remote from the hinge may be depressed towards the lower end of the cap component 10 by finger pressure. The cap component 10 may actually be moulded with a frangible web of polypropylene that connects the free end of the actuator portion 12 to the remainder of the cap component 10. Such a web may prevent unintentional actuation of the aerosol during transportation and storage, and is broken when the actuator is used for the first time.

The free end of the actuator 12 remote from the hinge includes a finger grip 14 comprising an array of circular openings. Between the finger grip 14 and the hinge, the actuator 12 includes an opening with a short tube 16 extending downwardly therefrom. The tube 16 has an open lower end (as viewed in FIG. 3) that faces the lower end of the cap component 10. The lower end of the tube 16 is enlarged so as to create a shoulder that abuts the top of the valve stem of an aerosol valve fitted to the aerosol canister. The opening at the upper end of the tube 16 is in fluid communication with the nozzle component 20, as described in more detail below.

The actuator 12 has an elongate recess in its upper surface (as viewed in FIGS. 1 and 3) which extends from the opening at the upper end of the tube 16 to an open front end at the external front surface of the actuator 12. The lower part of the recess is enlarged. The enlarged lower part of the recess accommodates the nozzle component 20.

The nozzle component 20 is shown more clearly in FIGS. 4 and 5. FIG. 4 shows the nozzle component 20 in an open state. The main body of the nozzle component 20 is formed as a slightly flattened tube with an inclined open end. The lower surface of the nozzle component 20 (as viewed in FIG. 4) is formed with three downwardly-projecting conical studs 22. In its open state, the open front end of the nozzle component 20 forms an outlet opening 24. The rear end (as viewed in FIG. 4) of the nozzle component 20 is closed but an inlet opening is formed in the underside of the nozzle component 20, near the rear end. A fluid conduit is therefore formed between the inlet and outlet openings 26,24 when the nozzle component 20 is in its open state.

The nozzle component 20 is moulded in its open state and then the cap component 10 is moulded about the nozzle component 20.

The moulding process is a two-shot injection moulding process in which, firstly, the nozzle component 20 is injection moulded in a thermoplastic elastomeric material in its open state, as shown in FIG. 4. The cap component 10 is then injection moulded in polypropylene directly about the nozzle component 20, with the inlet 26 of the nozzle component 20 in registration with the tube 16 of the actuator 12 and the front end of the nozzle component 20 flush with the front face of the actuator 12. The cap component 10 and nozzle component 20 are locked together by moulding of the polypropylene material around the studs 22. Application of the polypropylene material to the previously-moulded nozzle component 20 causes the nozzle component 20 to be compressed to a closed state (as shown in FIGS. 1 and 3). Nonetheless, the absence of polypropylene material over the upper surface of the nozzle component 20 permits the nozzle component 20 to deform upwardly under pressure, as described below, thereby allowing the nozzle component to revert, at least partially, to the open state shown in FIG. 4. Having been initially moulded in the open state, the nozzle component 20 retains a "memory" of that state and this, combined with the fact that the nozzle component 20 is held in the closed state under compression, facilitates the return of the nozzle component 20 to the open state when pressure is applied to it by flow of material through the nozzle component 20. In other embodiments, the upper surface of the nozzle component 20 may be completely covered by the material of the cap component 10, but the thickness of such material may be relatively small, thereby still permitting expansion and opening of the nozzle component 20.

The aerosol spray cap is engaged with an aerosol canister so that the upper end of the aerosol valve stem is received within the lower end of the tube 16 of the cap component 10. In use, in order to release the contents of the aerosol canister, downward finger pressure is applied to the finger grip 14, thereby depressing the actuator 12. Depression of the actuator 12 causes the valve stem also to be depressed, thereby allowing the canister contents to be released under pressure along the tube 16 of the cap component 10 and through the inlet opening 26 of the nozzle component 20. The pressure of the canister contents will cause the nozzle component 20 to deform and expand. The upper and lower walls of the nozzle component 20 will therefore separate so that the nozzle component 20 is deformed to its open state, as shown in FIG. 4. For as long as the actuator 12 remains depressed, the canister contents will pass along the fluid conduit of the nozzle component 20 and exit the aerosol spray cap, under pressure, through the outlet opening 24.

In order to cease dispensing of the canister contents, finger pressure is removed from the finger grip 14, thereby causing the actuator 12 to revert to its relaxed position (the aerosol valve stem being biased upwards in conventional fashion). As the valve stem rises, emission of the canister contents ceases. The pressure of the canister contents within the fluid conduit of the nozzle component 20 will almost instantly fall to a level where the upper wall of the nozzle component 20 will collapse back into contact with the lower wall, thereby closing the inlet opening 26 whilst simultaneously expelling any remaining material from the fluid conduit of the nozzle component 20. Build-up of dispensed product in the fluid conduit is thereby prevented.

Figure 6:
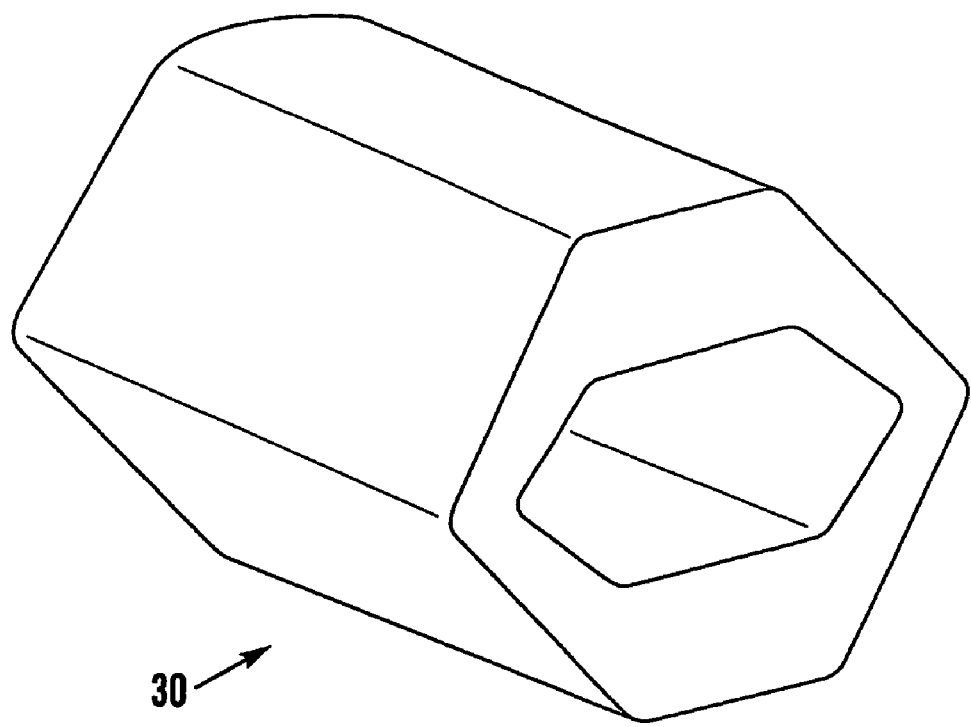
FIG. 6 is a perspective view of a second embodiment of a nozzle component in its open configuration.
Figure 7:
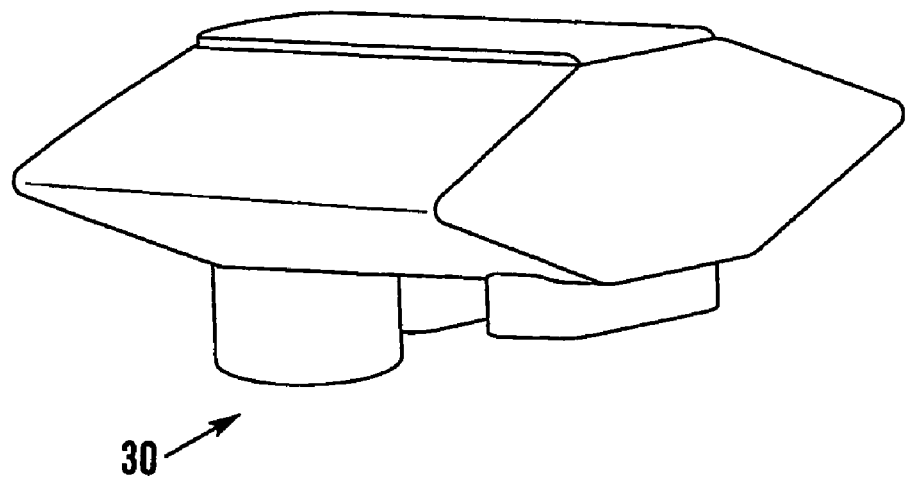
FIG. 7 is a perspective view from one side and to the rear of the nozzle component of FIG. 6 in its closed configuration.

FIGS. 6 and 7 show a second embodiment of a nozzle component 30 that is broadly similar in form and function to the nozzle component 20 described above. This embodiment of the nozzle component 30 differs from that previously described principally in that both the external surface of the nozzle component 30 and its internal bore are generally hexagonal in shape. The nozzle component 30 is moulded in the open configuration shown in FIG. 6. When the remainder of an actuator cap is subsequently moulded (eg in polypropylene) about the nozzle component 30, the nozzle component 30 is compressed to the configuration shown in FIG. 7.

Figure 8:
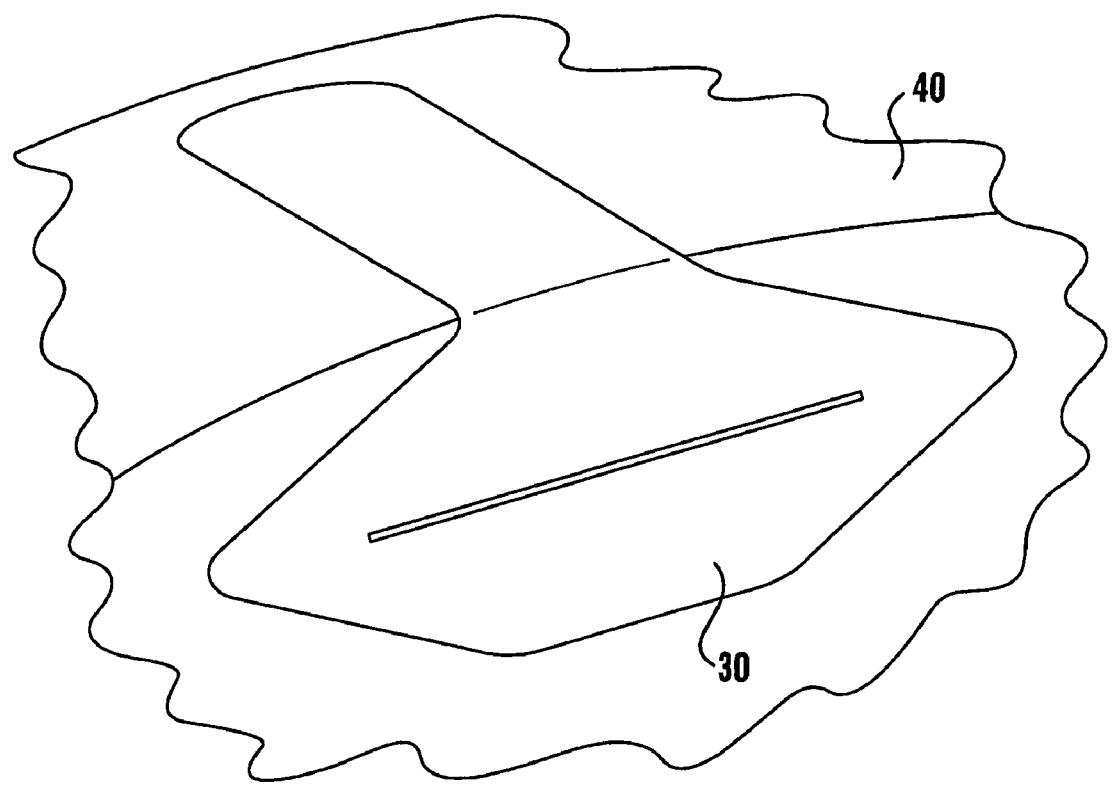
FIG. 8 is a fragmentary perspective view of an aerosol spray cap including a nozzle component of FIG. 6.

FIG. 8 shows a fragment of an aerosol spray cap that incorporates the nozzle component 30 of FIGS. 6 and 7. The nozzle component 30 occupies a correspondingly-shaped recess in the cap component 40, the material of the cap component 40 being moulded around the nozzle component 20, as described above. In this embodiment, in the completed assembly the upper surfaces of the nozzle component 30 and cap component 40 are substantially flush. The relatively rigid material (eg polypropylene) of the cap component 40 pinches the nozzle component 30 to the closed configuration, in which the upper and lower surfaces of its internal bore are pressed together, as shown in FIG. 8. The central upper face of the nozzle component 30 is thus exposed, with the faces at either side being covered by a layer of more rigid material, the thickness of which reduces progressively from the outermost extremities of the nozzle component 30 towards the exposed central face. As for the embodiment described above, when the spray cap is actuated, product flows from the aerosol container via the valve stem and into the nozzle component 30. The pressure of such material causes the nozzle component 30 to deform and expand, against the restraining force exerted on the nozzle component 30 by the surrounding more rigid material, so that the internal bore of the nozzle component 30 opens and product is able to flow out.

Figure 9:
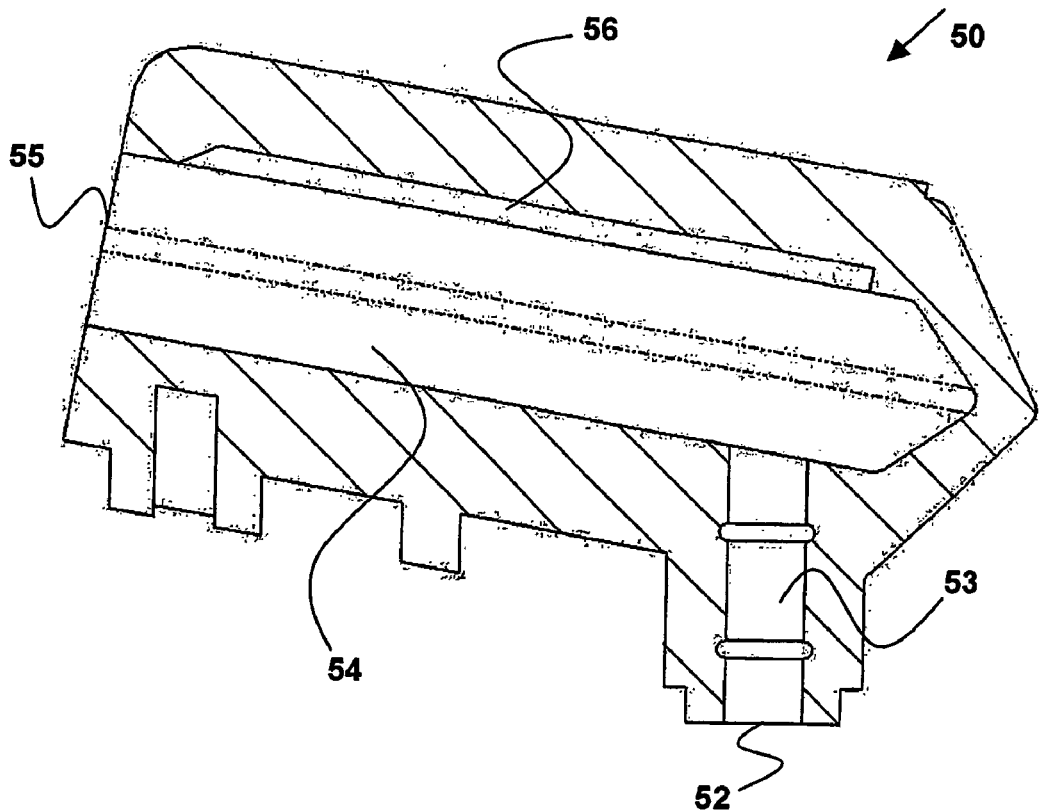
FIG. 9 is a cross-sectional view of a third embodiment of a nozzle component in its open configuration.
Figure 10:
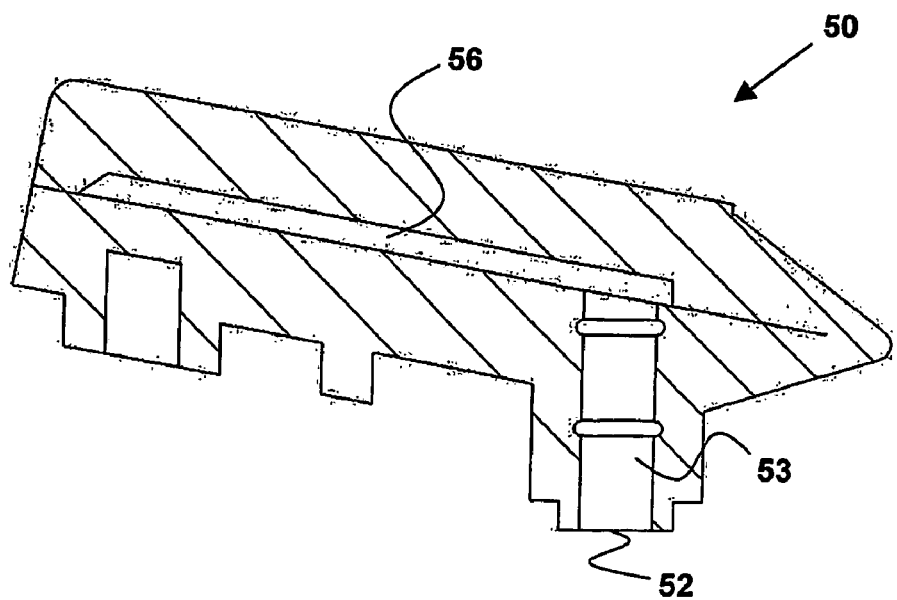
FIG. 10 is a cross-sectional view of a third embodiment of a nozzle component in its closed configuration.

Finally, FIGS. 9 and 10 show a third embodiment of a nozzle component 50 that is similar in form and function to the second embodiment of a nozzle component 30 described above. The third embodiment 50 is moulded in the open configuration shown in FIG. 9, and has an inlet opening 52, an outlet opening 55 and a fluid conduit 53,54 that extends therebetween. The fluid conduit 53,54 comprises a generally cylindrical inlet portion 53 leading to an outlet portion 54 with a generally hexagonal cross-section. The inlet and outlet portions 53,54 are disposed generally perpendicular to one another. These features of the third embodiment 50 are very similar to those of the second embodiment 30.

However, unlike the second embodiment 30, the third embodiment 50 includes a recess 56 in the interior surface of the upper wall of the nozzle component 50. The recess 56 is formed so as to define part of the outlet portion 54 of the fluid conduit 53,54. In particular, the recess 56 extends from an upstream end that is situated opposite the inlet portion 53 of the fluid conduit 53,54, along the longitudinal axis of the interior surface of the upper wall, to a downstream end that is situated a short distance from the outlet opening 55. The recess 56 has a generally rectangular cross-section, with the end wall of the recess 56 at the downstream end being inclined such that the depth of the recess 56 reduces gradually until it reaches that part of the outlet portion 54 that is situated immediately adjacent the outlet opening 55.

When the remainder of an actuator cap is subsequently moulded (eg in polypropylene) about the nozzle component 50, the nozzle component 50 is compressed to the closed configuration shown in FIG. 10. In particular, the outlet portion 54 of the fluid conduit 53,54 is collapsed so that the interior surface of the upper wall of the nozzle component 50 is urged against the interior surface of the lower wall of the nozzle component 50. In this configuration, the outlet opening 55, and also that part of the outlet portion 54 that is disposed between the downstream end of the recess 56 and the outlet opening 55, are closed, and hence only the recess 56 remains in fluid communication with the inlet portion 53 of the fluid conduit 53,54. The recess 56 hence forms a cavity for the liquid product which has a significantly smaller volume than that of the outlet portion 54 of the fluid conduit 53,54 in the open configuration.

During use, the third embodiment 50 works in a very similar manner to the second embodiment 30. However, since the recess 56 will generally contain a small amount of the liquid product during use, less pressure is required to deform the nozzle component 50 into the open configuration. The third embodiment 50 therefore has a more reproducible dispensing action than the first and second embodiments 20,30, and is therefore suitable for those applications in which it is acceptable to leave a small amount of the liquid product in the fluid conduit of the nozzle component 50.

The invention claimed is:

1. A process for the manufacture of dispensing apparatus, the process comprising
    moulding a first component including a tubular outlet, the first component being moulded in a first, relatively less rigid material, and
    moulding a second component about the first component, the second component being moulded in a second, relatively more rigid material,
    wherein the first component is moulded with the tubular outlet in an open configuration and moulding of the second component compresses the tubular outlet to a closed configuration, the tubular outlet being elastically deformable, by the application of pressure to the tubular outlet, from the closed configuration to the open configuration.

2. A process as claimed in claim 1, wherein the first, relatively less rigid, material that is suitable for the moulding of the first component is a thermoplastic elastomer.

3. A process as claimed in claim 1, wherein the second, relatively more rigid, material that is suitable for the moulding of the second component is polypropylene.

4. A process as claimed in claim 1, wherein the dispensing apparatus is arranged such that liquid product flowing into the tubular outlet above a certain pressure, in use, is sufficient to elastically deform the tubular outlet to its expanded dispensing configuration.

\* \* \* \* \*